July 28, 1953    M. E. FRANCISCO    2,646,897
HANDLING APPARATUS
Filed Jan. 8, 1951
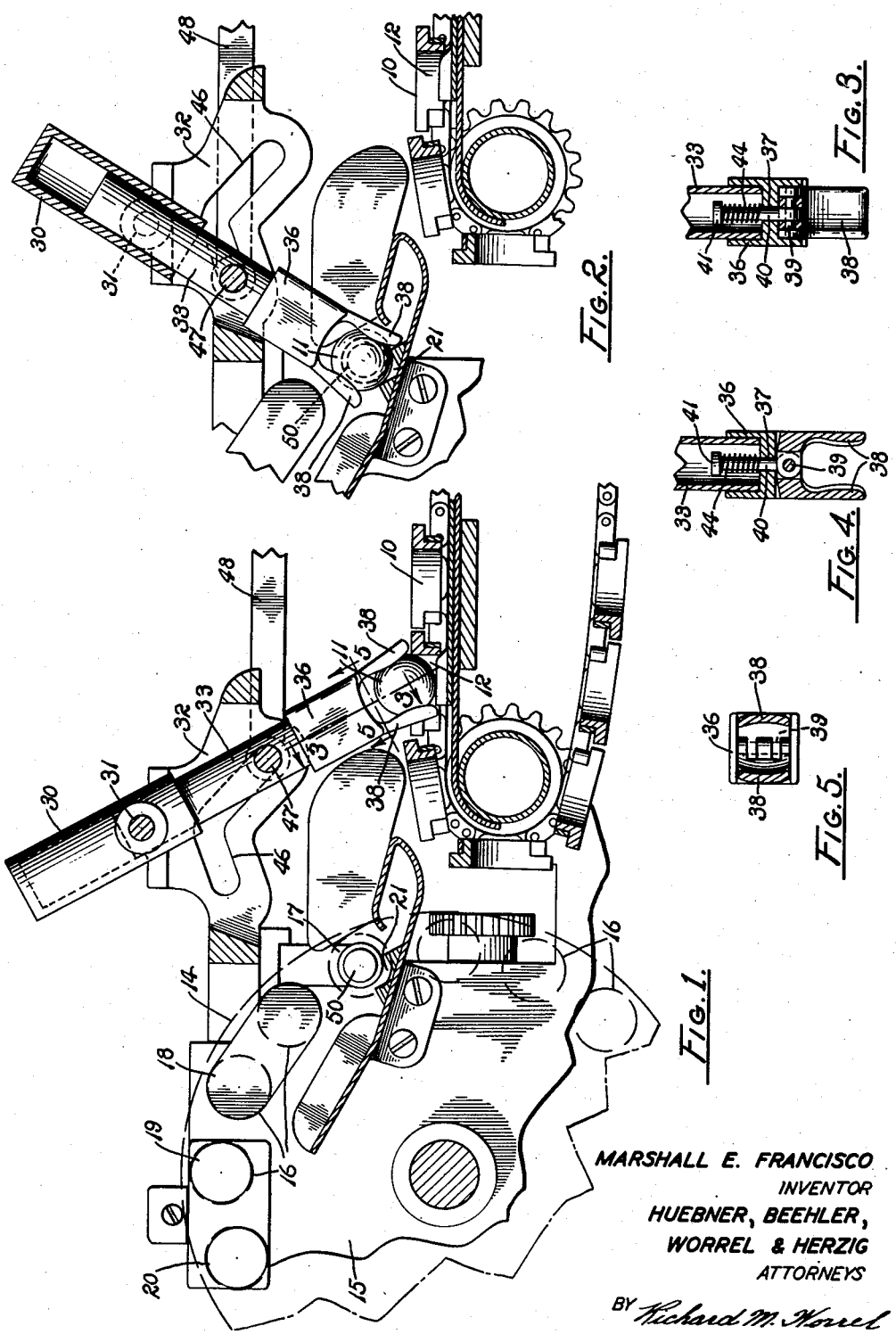
MARSHALL E. FRANCISCO
INVENTOR
HUEBNER, BEEHLER,
WORREL & HERZIG
ATTORNEYS

Patented July 28, 1953

2,646,897

UNITED STATES PATENT OFFICE 2,646,897

HANDLING APPARATUS

Marshall E. Francisco, San Jose, Calif.

Original application August 6, 1949, Serial No. 111,060. Divided and this application January 8, 1951, Serial No. 204,969

5 Claims. (Cl. 214—1)

1

The present invention relates to handling apparatus and more particularly to a mechanical hand adapted to convey articles such as fruit from a source thereof at which the articles are received in predetermined attitude to a dstination therefor while maintaining the fruit in said attitude.

This application is a division of my copending application for United States Letters Patent, Serial No. 111,060 filed August 6, 1949, entitled "Pitting and Stuffing Apparatus", and the subject invention is conveniently illustrated by reference to the conveyance of fruit from a metering and aligning conveyor to a position for loading into a carrier as more particularly described in connection with the pitting and stuffing apparatus described in said copending patent application. In the pitting and stuffing apparatus oblong fruit such as olives are deposited in a hopper and conveyed from the hopper by a metering and aligning device which periodically places fruit at a position to be grasped by the hand of the instant invention with the major axes of such fruit in predetermined attitude. The hand is utilized in the synchronous grasping of fruit located by the metering and aligning device in a position of availability, elevationally conveying the fruit from such position of availability, and placing the fruit in a trough at which point a reciprocated pushing member thrusts the fruit laterally from the hand into a carrier while the original attitude of the fruit is maintained for subsequent pitting and stuffing convenience.

It is essential that the hand engage the fruit only lightly to avoid damage thereto, dependably maintain the attitude of the fruit while conveying the same, and release the fruit when it is engaged delicately by the pushing member.

An object is to provide an improved means adapted to lift fruit and the like from a position of availability thereof and to locate the same at a position removed therefrom while accurately maintaining its initial attitude.

Another object is to provide a mechanical hand adapted to grasp, to lift, to convey, and to deposit fruit with a minimum of handling damage thereto.

Further objects are to provide improved elements and arrangements thereof in a device of the character and for the purpose set forth that are simple in structure, dependable in operation, and economical to employ.

Further objects and advantages will become apparent in the subsequent description in the specification.

2

In the drawings:

Fig. 1 is a side elevation of a mechanical hand of the present invention shown in association with a fragmentarily represented metering and aligning device and a trough into which fruit is deposited in predetermined attitude for insertion into a carrier for subsequent pitting, stuffing, or the like, the hand being shown in position grasping a fruit to be conveyed.

Fig. 2 is a view similar to Fig. 1 but showing a portion of the hand in longitudinal section to illustrate the construction thereof and in a position locating the fruit for insertion into the carrier.

Fig. 3 is a fragmentary longitudinal section of the hand, as taken on line 3—3 of Fig. 1.

Fig. 4 is a longitudinal section of the hand as viewed in right angular relation to the view shown in Fig. 3.

Fig. 5 is a transverse section of the hand as viewed from line 5—5 in Fig. 1.

Referring in greater detail to the drawing:

In Figs. 1 and 2 a metering and aligning conveyor is fragmentarily represented at 10. The structure and operation thereof is described in detail in my above identified copending application, of which the subject application is a division. It is sufficient for present purposes to note that the metering and aligning conveyor successively delivers fruit or the like indicated at 11 to a position of availability for the hand indicated at 12.

A circular carrier is shown at 14 mounted for concentric rotation in a substantially vertical plane in any suitable frame 15. The carrier has a plurality of fruit receiving compartments 16 formed axially therethrough in an annular arrangement concentric to the carrier. The carrier is rotated in stepped progression by a mechanism not shown in the drawing of the instant application so that the compartments are successively located at a loading station 17 and pitting 18, stuffing 19, and/or polishing stations 20, or the like.

A trough 21 is provided at the loading station adapted to support fruit 11 in alignment with compartments located therein for the thrusting of fruit from the hand of the present invention into the compartments. The trough is supported on the frame 15 in any suitable manner in the position described and represents a position to which the subject invention is adapted to convey fruit while maintaining the attitude assumed at the position of availability.

In the "Pitting and Stuffing Apparatus" to which reference has been made, it is desired to transfer in timed spaced relation fruit synchronously with its delivery at the position 12 of availability to the loading station 17. The mechanical hand provided for the purpose consists of an upper tubular member 30 mounted for pivotal movement in a substantially erect plane, as at 31, on a bracket 32 bolted, or otherwise secured to the frame 15. As evident in Figs. 1 and 2, an inner tubular member 33 is telescopically mounted at the lower end of the tubular member 30 and downwardly extended therefrom.

The lower end of the inner tubular member 33 is capped, as at 36 in Figs. 1 and 2. The cap 36 is provided with a central bore 37 coaxial of the tubular members 30 and 33. A pair of fingers 38 are endwardly extended from the cap 36 and pivotally interconnected by a pin 39. The pin is journaled in right angular relation in a mounting rod 40 which is slidably extended through the bore 37 in the cap and provided with an enlarged inner end 41.

A helical spring 44 is located under initial compression inwardly disposed to the tubular member 33 between the cap and the enlarged inner end 41 of the rod 40. The fingers have upper ends arcuately shaped as shown in Fig. 3 to rock on the cap so that movement of the rod inwardly of the cap under urging of the spring 44 rocks the fingers relatively toward each other about their pivotally interconnecting pin 39. Movement of the fingers away from each other is opposed by the spring by the rocking action of the upper ends of the fingers on the cap. The fingers are configurated slidably to receive fruit to be grasped and transferred from the position of availability 12 to the trough 21 and as endwardly viewed in Fig. 5 preferably are of a form defining a substantially circular or oblong opening.

As shown in Figs. 1 and 2, a camway 46 is formed in the bracket 32 adjacent and below the pivotal mounting 31. The camway has an elevated central portion and relatively lower end portions. A cam follower 47 is extended right angularly from the inner tubular member 33 and engaged with the camway. The camway is arranged so that through the association of the cam follower therewith, the telescopic members are extended to engage a fruit at the position 12, as shown in Fig. 1, contracted upon pivotal movement of said members to lift the fruit from the position of availability, and reextended to place the fruit on the loading trough 21.

An endwardly reciprocated arm 48 is pivotally connected to the inner tubular member 33, as by being pinned to the cam follower 47. The arm serves pivotally to reciprocate the telescopic tubular members 30 and 33 synchronously with positioning of fruit 11 by the metering and aligning conveyor 10 at the position of availability 12 by means of a mechanism, not shown, which also serves to rotate the carrier 14 in stepped progression.

A loading plunger 50 is mounted on the frame 15 in any suitable manner, not shown, for longitudinal reciprocal movement in alignment with the trough 21. The motivating mechanism for the metering and aligning conveyor 10, carrier 14, and arm 48 also serves synchronously to reciprocate the plunger to and from the trough so that when the fingers 38 move a fruit 11 into the trough 21, the plunger thrusts the fruit from the fingers endwardly along the trough into a compartment 16 located at the loading station 17.

Operation

The operation of the device is believed to be clearly apparent and is briefly summarized at this point.

Fruit 11 or the like is individually delivered to the position of availability 12 in timed spaced intervals and there positioned in predetermined attitude with the major axes of oblong fruit such as olives, transversely disposed to the metering and aligning conveyor 10. Concurrently with such location of the fruit, the hand is pivoted to the position shown in Fig. 1 and by operation of the cam follower 47 in the camway 46 the fingers 38 are moved downwardly to grasp the fruit. The action of the spring 44 provides the dependable grasping of the fruit. As the inner tubular member 33 is moved downwardly, the fingers 38 fit over the fruit 11 and are pivoted relatively outwardly about the pin 39 in a rocking motion of their upper ends in engagement with the cap 36 drawing the mounting rod 40 endwardly of the tubular member against the compression of the spring 44. Thus, the spring functions to cause the fingers to have a grasping effect dependably embracing the fruit for subsequent forcible ejection therefrom. The pivotal movement of the fingers 38 about the pin 39 and rotatable positioning of the rod 40 in the cap 36 permit automatic accommodation of the hand to fruit positioning even though slightly displaced from the precise position transversely of the metering and aligning conveyor 11. Subsequently, the hand during its pivotal movement, raises the fruit 11 grasped by the fingers and moves the fruit while maintaining its original attitude to the trough 21.

When the fruit 11 is located in the trough 21, the loading plunger 50 is moved endwardly by a drive mechanism described in my above identified copending application, thrusting the fruit along the trough into a compartment 16 at the loading station 17 in substantially the same attitude in which the fruit is positioned by the metering and aligning conveyor 10 at the position of availability 12.

Upon the return stroke of the arm 48 to return the hand from the position shown in Fig. 2 to the position shown in Fig. 1, the metering and aligning conveyor 10 arranges a succeeding fruit at the position of availability 12. During the return pivotal movement, the fingers retrace their path, moving upwardly and away from the trough 21 and then downwardly in alignment with a fruit 11 located at the position of availability 12 and grasp the same as previously described. The described cycle of operation is repeated to convey successive fruit to the trough.

The hand of the present invention is adapted to grasp, lift, convey, and deposit fruit and other delicate articles with an absolute minimum of handling damage thereto. The device is economical to produce, simple in structure, and dependable in its operation.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A device for handling fruit comprising a pair of telescopically associated members, one thereof being mounted for pivotal movement about an axis transversely disposed to the telescopical association of the members, a cam follower extended from the other member substantially normal to the plane of pivotal movement of said members, a cam having a camway formed therein receiving the cam follower and translating pivotal movement of the telescopic members into responsive telescopic contraction and extension thereof, a cap having a central bore mounted on the extended end of the member bearing the cam follower, a pair of fingers positioned against the cap in substantial alignment with the telescopic members, a wrist pin pivotally interconnecting the fingers, a mounting pin extended through the bore in the cap and pivotally connected to the wrist pin, and a spring mounted under initial compression between the inner end of the mounting pin and the cap.

2. A device for handling fruit comprising a pivotally mounted outer member, an inner member telescopically mounted in the outer member, a cam follower extended from the inner member substantially normal to the plane of pivotal movement of said members, a cam having a camway formed therein receiving the cam follower and translating pivotal movement of the telescopic members into responsive telescopic contraction and extension thereof, a cap having a central bore mounted on the extended end of the inner member, a pair of fingers positioned against the cap in substantial alignment with the telescopic members, said fingers having end portions adapted to rock on the cap, a wrist pin pivotally interconnecting the fingers, a mounting pin having the wrist pin journaled transversely thereof extended through the bore in the cap, and a spring mounted under initial compression between the inner end of the mounting pin and the cap.

3. In a device for handling articles, the combination of a hollow arm having an extended portion, a cap having a central bore mounted on the extended portion of the arm, a plurality of fingers positioned against the end of the cap and extended therefrom in substantial alignment with the arm, means pivotally interconnecting the fingers, said fingers having end portions in cap engagement configurated to rock thereon as the fingers are moved pivotally toward or away from each other and during such pivotal movement to move the pivotal connecting means in spaced relation to the cap, a mounting pin having the pivotal connecting means journaled therein extended through the bore in the cap, and a spring mounted under initial compression between the inner end of the mounting means and the cap.

4. In a device for handling fruit, a mechanical hand comprising a substantially cylindrical hollow arm, a cap having a central bore therethrough mounted on an end of the arm, a pair of fingers defining a substantially cylindrical opening therebetween arranged in substantial alignment with the arm and having arcuate convex portions in rocking engagement with the cap, a wrist pin interconnecting the fingers for pivotal movement, a mounting member having the wrist pin journaled therein extended through the bore in the cap, and a spring mounted under initial compression between the inner end of the mounting member and the cap.

5. A device for handling fruit and the like comprising a pair of telescopic members, trunnion means mounting the members for unitary pivotal movement, a cam follower extended from one of the members, a cam having a camway formed therein receiving the cam follower and translating pivotal movement of the telescopic members into responsive telescopic contraction and extension thereof whereby one of the members is endwardly reciprocated, a cap mounted on the extended end of the endwardly reciprocated member providing a surface disposed endwardly from its respective member, a plurality of pivotally interconnected fingers mounted on the endwardly reciprocated member having convex edges in rocking engagement with the endwardly disposed surface of the cap, and resilient means urging the convex edges of the fingers into cap engagement whereby the fingers are resiliently urged into predetermined grasping relation.

MARSHALL E. FRANCISCO.

References Cited in the file of this patent
UNITED STATES PATENTS

| Number | Name | Date |
|---|---|---|
| 1,362,286 | Gerhardt | Dec. 14, 1920 |